March 25, 1952     R. F. HOLLIS     2,590,318

VALVE

Filed Aug. 7, 1948     2 SHEETS—SHEET 1

INVENTOR:
ROBERT F. HOLLIS
BY *Bruninga and Sutherland*
ATTORNEYS.

March 25, 1952  R. F. HOLLIS  2,590,318
VALVE

Filed Aug. 7, 1948  2 SHEETS—SHEET 2

INVENTOR:
ROBERT F. HOLLIS
BY
ATTORNEYS.

Patented Mar. 25, 1952

2,590,318

UNITED STATES PATENT OFFICE 2,590,318

VALVE

Robert F. Hollis, Alton, Ill., assignor to Alton Box Board Company, Alton, Ill., a corporation of Delaware Application August 7, 1948, Serial No. 43,031

4 Claims. (Cl. 251—27)

1

This invention relates generally to valves and particularly to valves adapted to control the flow of paper stock and other solid-laden liquids.

In industries where the flow of solid-laden liquids through pipe lines must be regulated as to rate of flow and varied from time to time, great difficulties have been encountered because of the tendency of the solids to be thrown out of suspension when the stream passes the obstruction provided by the usual control valve. Moreover, where the solids contained in the stream are abrasive in character, there is substantial erosion upon the valve parts, so that the adjustment of the valve to a given position today may result in passing a stream of substantially greater volume per unit of time than was passed by the valve in the same position last week. In the control of the flow of paper stock (or any other liquid containing fibrous solids in suspension) through pipe lines, great difficulties are encountered when the flow is interrupted for any substantial period of time because the solids tend to drop out of suspension and clog the pipe line.

The object of the present invention, generally stated, is to provide a valve suitable for either regulating or completely shutting off the flow of solid-laden liquids through pipe lines.

Another object of the invention is to provide a valve which will be devoid of tendency to throw suspended solids out of suspension as they traverse the valve.

A more specific object of the invention is to provide a valve, the wear-subject component parts of which are readily interchangeable.

Other objects will become apparent to those skilled in the art when the following description is read in connection with the accompanying drawings wherein.

In accordance with the present invention, a valve is provided with a throat member having an orifice which is circular at any axial increment, but of gradually decreasing radius from the outer end toward the increment of greatest constriction. The orifice through the throat member is generally convexo-conical, the elements of the cone being not rectilinear, but in the form of an inwardly convex curve. It is desirable that the throat member have its orifice formed according to the general style of an hour glass, so that the increment of greatest constriction is midway between its ends, as in such an arrangement, the throat member may be reversed with reference to the other valve parts when the portion of the orifice toward one end has become worn.

Cooperating with the throat member is a valve head which, in accordance with the present invention, is generally concavo-conical with the elements of the cone outwardly concave and preferably on somewhat greater radius of curvature than the interior walls of the orifice through the throat member.

The arrangement of a throat member in cooperative relation with a valve head of the character generally described above produces an organization which is internally stream-lined and consequently substantially eliminates the tendency of solid-laden liquids traversing the same to drop their solids. Furthermore, depending upon the specific curvatures adopted for the orifice and the head, the organization may be such as to yield a fine control of the stream at any zone, as, for example, toward fully closed position or toward fully open position, without in either case interfering with the stream-lining of the surfaces presented to the flowing stream. It is desirable also that the tip of the head extend through the orifice to a point substantially on the opposite side (from the body of the head) of the constriction when the valve is near its fully closed position. With such an arrangement, a substantial space on both sides of the greatest constriction and on both sides of the seat (which will seldom, if ever, be at the point of greatest constriction) is occupied by the head when the valve is fully closed, so that, irrespective of the direction of flow through the valve, a mechanical movement will take place on both sides of the point of greatest constriction and the seat when the valve is moved out of fully closed position. This mechanical movement on both sides of the sections indicated above will effectively relieve any tendency of the material to clog the valve.

Figure 1:
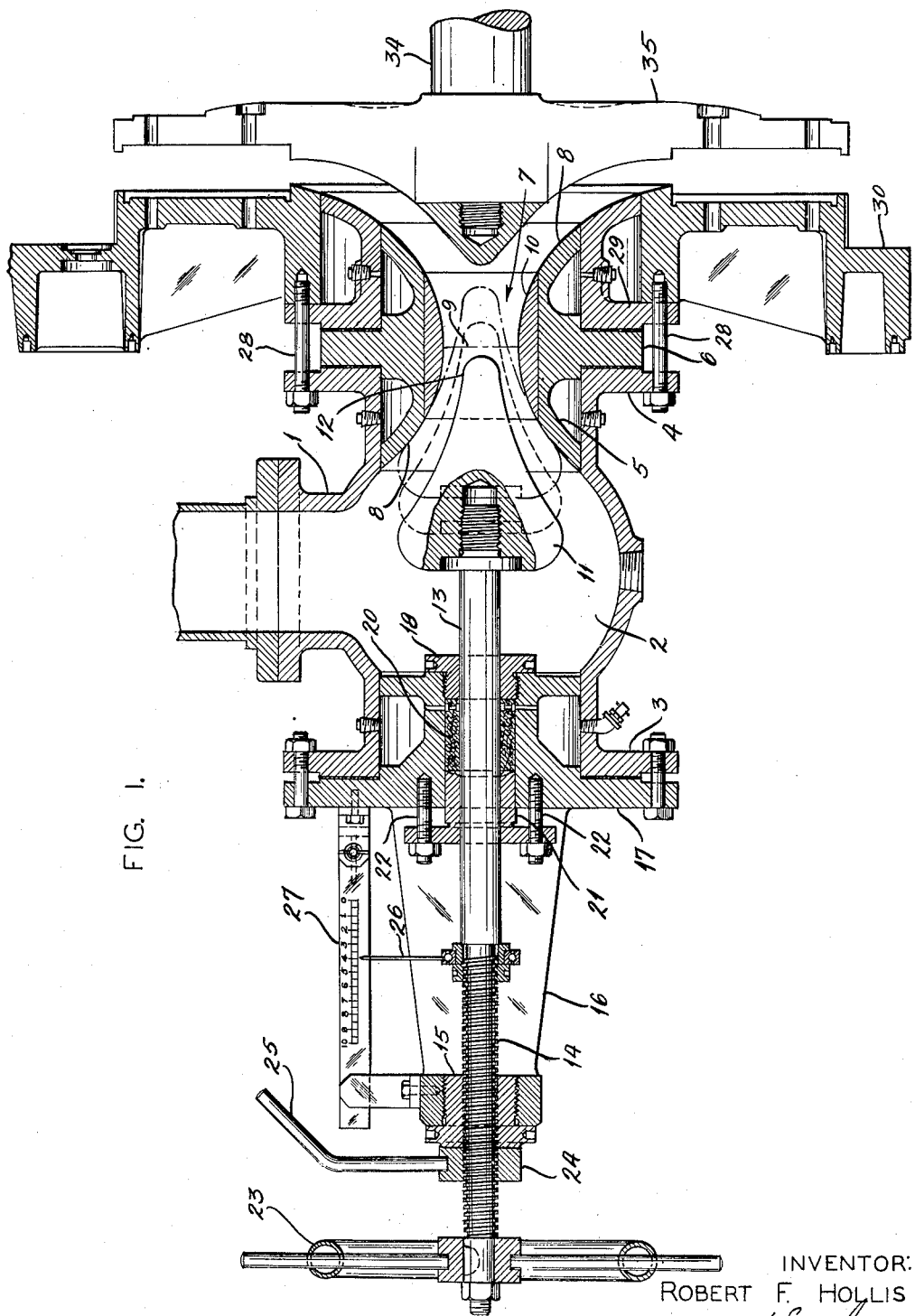
Figure 1 is a longitudinal sectional view of a valve constructed in accordance with the present invention and illustrated in association with a refiner of the type customarily employed in the paper industry.
Figure 2:
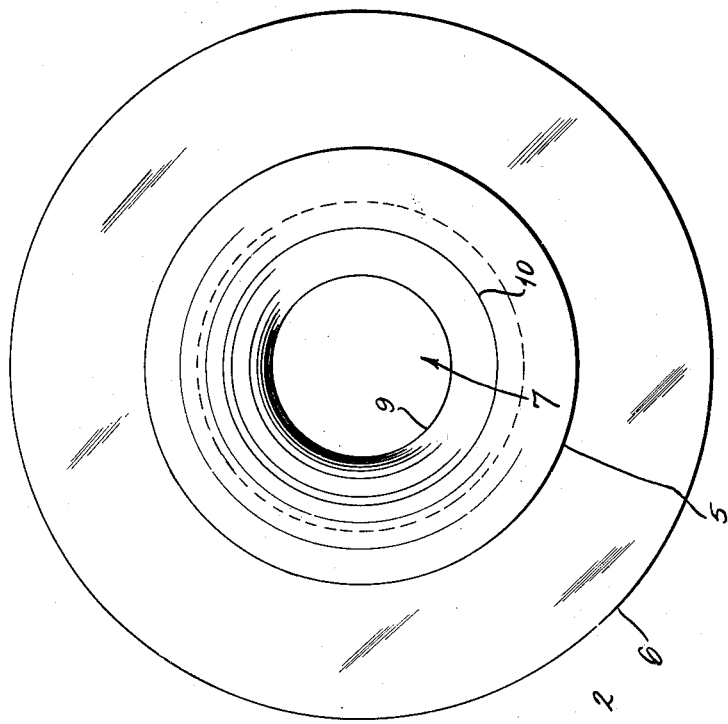
Figure 2 is an end view of the orifice member shown in Figure 1.
Figure 3:
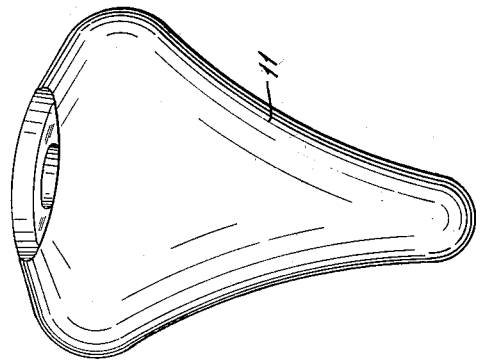
Figure 3 is a perspective view of the valve head shown in Figure 1.

Referring to Figure 1 for an illustrative embodiment of the invention, the valve consists of a housing 1 having a valve chamber 2 provided in the form shown with a pair of opposite identical connecting flanges 3 and 4.

A throat member 5 having a connecting flange 6 is arranged in complemental relation to the flange 4 of housing 1. The throat member 5 has an orifice 7 extending axially therethrough. As indicated above, the orifice 7 is circular at every axial section and is generally conical, though the defining walls 8 are arcuate. In the form shown, the section of greatest constriction in the orifice 7 is at its midpoint, as indicated by the line 9, and the body of the throat member is symmetrical about such midpoint. If desired, an insert 10 (formed of metal having greater resistance to wear than the body of the member) may constitute a part of the throat member 5.

Cooperating with throat member 5 to control the flow of fluids therethrough is a parsnip-shaped head 11 movable axially of the throat member to control the size of the effective orifice or to shut off flow completely. The head 11 is of generally conical shape, but its exterior walls are arcuate preferably about a radius longer than the radius of curvature 8 on the throat member. The head 11 is provided with a tip portion 12 of substantially less diameter than the diameter of the throat member at its midpoint 9, so that, when the head 11 is in its fully closed position, the tip 12 thereof will have passed beyond the midpoint 9 of the throat member.

In order to move the head 11 axially of throat member 5, the head is mounted upon a stem 13, which extends through a suitable arrangement of packings to the exterior of the housing 1. The stem 13 is threaded, as shown at 14, and mounted within an internally threaded part 15 carried by a yoke 16, which latter is an integral part of, or suitably secured to, a stuffing box head 17 connected to flange 3 of housing 1. The sealing of the stem 13 within the barrel of the stuffing box may be accomplished in any suitable way. For example, by threading a gland 18 into the stuffing box head at the inner end thereof, a seat is provided, against which suitable packing 20 may be compressed from the exterior of the head 17 by means of a flanged gland 21 connected by means of studs 22 to the head 17.

On the outer end of stem 13, a manipulating wheel 23 is fixed so that, by turning the same, stem 13 is advanced axially toward or away from the position whereat head 11 seats within throat member 5. A lock nut 24 having a handle 25 is also mounted upon the threads 14 of stem 13.

Mounted upon stem 13 in a manner to be held against relative axial movement, but free for relative circular movement, is a pointer 26 cooperating with a scale 27, one end of which is mounted on yoke 16 and the other end on stuffing box head 17.

In the form shown in Figure 1 of the drawings, flange 4 of housing 1 is connected directly to the intake portion of a Sprout-Waldron refining engine commonly used in the paper industry. This connection is accomplished by studs 28 extending through flange 4 and the flange of an adapter 29 and threaded into the end shell 30 of the Sprout-Waldron refiner. Adapter 29 is provided to fill the space between throat member 5 and the central portion of end shell 30, which is of greater diameter than the exterior diameter of throat member 5. In connecting the parts together, the flange 6 of the throat member is interposed between flange 4 of the valve housing and the corresponding flange on adapter 29 with suitable gaskets, so that the throat member is appropriately sealed in position.

The housing 1 is so constructed and arranged that the throat member 5 may be assembled either adjacent flange 4, as shown, or adjacent flange 3. In the latter event, the valve stem and its associated mechanisms will, of course, be mounted at flange 4. Moreover, the throat member 5 may be reversed so as to present toward head 11 the portion of the hour glass which, as shown in the drawings, is disposed away from the head 11. Accordingly, when wear occurs at one side of the throat member, an extended life may be obtained by reversing the throat member. It is important to note, however, that as wear occurs, either on the interior of the throat member or on the exterior of the head, the section at which seating between these members takes place progresses, and consequently the useful life of the valve, even without reversing the position of the throat member, is very long.

Figure 4:
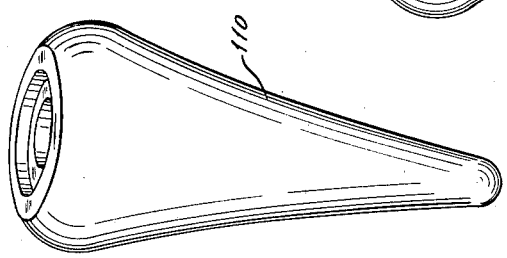
Figure 4 is a perspective view of a modified form of valve head.

The shape of the head may be varied, as, for example, by substituting for head 11 a head 110 of the character shown in Figure 4. In such event, however, it is preferred to change the internal contour of the throat member. The latter is easily accomplished by removing the member 6 and substituting another.

In arriving at the respective curvatures of the head and throat members, it is advantageous to achieve a relation wherein, when the head is in the region of travel where the stream passed is relatively fine, the width of the net orifice varies on substantially the same gradient upstream as downstream from the radius at while the stream is most constricted. It has been discovered that, if the gradient of variation is parabolic, the tendency for stock to dewater as it passes the constriction is eliminated (save in exceptional cases where a tight wad of solids is entrained in the stock). To thus match the curvatures of the parts, with sufficient accuracy for practical purposes, any practical radius of curvature for the head or the throat is selected; a parabola (for example, having its half-latus-rectum equal to the acceleration of gravity) is plotted and the $x$ and $y$ intercepts measured; using the radius of contact (at fully closed position) as the zero position (corresponding to the zero intercepts at the vertex of the parabola), the respective intercepts are laid off along the first chosen circular arc (either the head or the throat) measuring all $y$ intercepts parallel to the radius of contact and measuring the $x$ intercepts along the circular arc. The series of loci, thus ascertained, define the ideal curvature for the companion part (i. e., the throat if the first chosen circular arc represented the head, or vice versa), but to facilitate manufacture without substantially mitigating the result, such ideal curvature may be sufficiently approximated by a second circular arc whose radius and center are so chosen that the arc departs from the parabolically located loci as little as may be (generally within the limits of machining tolerances) from the several loci. While such loci are laid out to present the parts in their closed position, the desired relation (of varying the net orifice on the same gradient at both sides of the radius at which the stream is most constricted) continues to obtain (within practical limits) as the valve is opened for a subtantial travel.

Even in those exceptional cases where a wad of solids may jam the valve, the valve may be cleared by quickly closing and then reopening to the desired point.

From the foregoing description, those skilled in the art should readily understand that the invention accomplishes its objects and provides a valve having a wide range of utility, which is relatively cheap to manufacture and of long, useful life.

While a complete disclosure of one embodiment has been given in the foregoing specification, it is to be distinctly understood that the invention is not limited to the details of such disclosure. On the contrary, the invention may be adapted in principle to a variety of forms and to a great multitude of uses without departing from the essentials thereof or the scope of the appended claims.

Having thus described the invention, what is claimed and desired to be secured by Letters Patent is:

1. A valve of the character described, comprising a throat member having an orifice of circular cross section, the surface elements of said throat being inwardly convex, a valve head movable axially of the throat member, the exterior surface of said head being generally concavo-conical, said throat member and head having a section at which the radius of each is the same, said section constituting a circle of tangence at which the throat member and head make line contact when the valve is closed, the radius of said throat at sections adjacent its circle of tangence being greater on both sides of said circle of tangence than the radius of said head at a section correspondingly adjacent its circle of tangence, and the differential between said radii varying on substantially the same gradient on both sides of the circle of tangence.

2. The valve of claim 1 wherein the gradient of radius differential is substantially parabolic.

3. In a valve of the character having a throat member providing a generally convexo conical orifice, and a generally concavo conical valve head mounted coaxially with said orifice for movement in an axial direction into and out of engagement with said throat member, said throat member and head when near their engaged position defining an annular duct through which fluid may flow, the outside and inside radii of said duct corresponding respectively to the inside radius of said throat and the outside radius of said head at each increment of length of the duct, the differential between said duct radii progressively increasing in each direction from a section of minimum differential, the improvement which comprises: coordinating the curvature of the surface element lines of said head and said throat so that the differential radii of said duct vary on the same gradient upstream as downstream from the section of minimum differential.

4. The valve of claim 3 wherein the surface element lines of the throat are circular arcs of uniform radius, wherein the surface element lines of the head are circular arcs of uniform radius different from that of the throat, and wherein the differential radii of the duct vary on a gradient approximating the parabola whose half-latus-rectum equals the acceleration of gravity.

ROBERT F. HOLLIS.

REFERENCES CITED

The following references are of record in the file of this patent:

UNITED STATES PATENTS

| Number | Name | Date |
|---|---|---|
| 1,172,351 | Gamble | Feb. 22, 1916 |
| 1,427,680 | English | Aug. 29, 1922 |
| 1,829,703 | Larner | Oct. 27, 1931 |
| 2,051,307 | Lorraine | Aug. 18, 1936 |

FOREIGN PATENTS

| Number | Country | Date |
|---|---|---|
| 229,481 | Great Britain | of 1925 |